3,024,136
METHOD FOR TREATMENT OF PENETRATABLE OR POROUS MATERIAL, AND PRODUCTS PRODUCED THEREBY
Lucien Sellet, Saddle River, N.J., assignor to Jaques Wolf & Co., Newark, N.J., a corporation of New Jersey
No Drawing. Original application Sept. 23, 1952, Ser. No. 311,149, now Patent No. 2,944,046, dated July 5, 1960. Divided and this application Sept. 11, 1959, Ser. No. 839,295
11 Claims. (Cl. 117—142)

This invention relates to a novel method for the treatment of materials, penetratable or porous in nature, with a modified amino-formaldehyde resin of the type described hereinafter in detail, and a water soluble or water dispersible high molecular weight organic compound containing at least one sulfo group. The invention also includes novel products resulting from the method of this invention. The method and products of this invention are of particular importance in the leather industry.

Objects and advantages of the invention will be set forth in part hereinafter and in part will be obvious herefrom, or may be learned by practice with the invention, the same being realized and attained by means of the steps, methods, combinations and improvements pointed out in the appended claims.

The invention consists in the novel steps, methods, combinations and improvements herein shown and described.

An object of my invention is to provide a novel method for filling the pores of a material which is penetratable or porous in nature. A further object of this invention is to provide a novel method for improving the smoothness of a material which is penetratable or porous in nature. A still further object of this invention is to provide a novel method for improving the fullness and tensile strength of leather products. A further object is to provide novel products formed in accordance with the methods set forth in the foregoing objects.

It has been found that the aforementioned objects may be realized by applying to the penetratable or porous material, hereinafter referred to as porous material, a cationic active modified amino-formaldehyde resin of the type disclosed in my parent application Ser. No. 311,149, filed Sept. 23, 1952, now U.S. Patent No. 2,944,046, of which this application is a divisional application, and an anionic active high molecular weight sulfo compound containing at least one sulfo group per molecule, and causing said modified amino-formaldehyde resin and said sulfo compound to react to form a water-insoluble reaction product which becomes fixed to said porous material. As will be readily observed from the description of the invention hereinafter, the sulfo compound used in the aforedescribed method may be in the form of a neutral salt or may have a free sulfo group.

Since the method of this invention is of particular importance in the treatment of leather, the present specification will be concerned chiefly with respect to the treatment of materials relating to the leather industry. It should be realized, however, that the principles of this invention are applicable to any porous material, such, for example, as paper, fabrics, and the like.

In the treatment of leather products and the like, the modified amino-formaldehyde resin and sulfo compound are dispersed on the leather and absorbed thereby by means of an aqueous bath whereby they react under acidic conditions to form a water insoluble compound which becomes fixed to the leather. This improves the fullness, tensile strength and smoothness of the grain of the treated leather.

Hence, if the sulfo compound is in the form of a neutral salt, the sulfo compound and modified amino-formaldehyde resin are put in an aqueous bath and the leather is treated in said bath for a sufficient period of time, usually three or four hours, until the sulfo compound and modified amino-formaldehyde resins have had time to be absorbed by the leather. Of course, either the modified amino-formaldehyde resin or sulfo compound may be dispersed on the leather in sequence instead of simultaneously if so desired, but it is advantageous to treat the leather simultaneously for the time of treatment is shortened. When both the neutral salt of the sulfo compound and the modified amino-formaldehyde resin have been absorbed by the leather, an acidic compound, such as sulfuric acid, citric acid, lactic acid, diglycolic acid, etc., or an acidic salt such as aluminum sulfate, aluminum chloride, sodium bisulfate is added to the bath to bring the pH of the bath to a definite acidic environment, for example a pH of about 3 or 4, whereupon the sulfo compound and modified amino-formaldehyde resin react forming a water insoluble compound which remains fixed to the leather.

When a sulfo compound is used which has a free sulfo group so as to be acidic in nature, the sulfo compound and modified amino-formaldehyde resin cannot be added to the bath simultaneously due to the acidic nature of the sulfo compound, a reaction would take place immediately, whereby a water insoluble compound would be formed in the bath, and a sufficient amount of said compound would not be absorbed by the leather. Hence, when a sulfo compound having the sulfo group in the free state is used, the leather must be treated with either the sulfo compound or modified amino-formaldehyde resin first, and subsequently with the other, but not simultaneously.

Illustrative examples of sulfo compounds which may be used are lignin sulfonate and its neutral salts such as sodium sulfo lignin and magnesium sulfo lignin; vegetable tannins such as wattle extract solubilized by sodium bisulfite as well as quebracho extract solubilized by sodium bisulfite, and the neutral water soluble salts of these extracts; and synthetic tannins, known as exchange tannins, having at least one sulfo radical. Included in these exchange tannins are both the acid tannins having a free sulfo group as well as the water soluble salts such as the sodium salts.

The above exchange tannins, preferably include the tannins formed by joining two moles of compounds such as phenol, cresol, xylenol, naphthol, catechol, resorcinol, naphthalene, anthracene and benzidine bridged with a methylene, sulfone, proplene or sulfonimido bridge. At least one mole of the phenol, cresol etc. compounds contain a sulfo group. Illustrative examples of these compounds are: disulfo dinaphthol methane, disulfo dinaphthyl methane, monosulfo dihydroxy diphenyl methane, a complex reaction product formed by reacting monosulfo dihydroxy methane with formaldehyde to give the formula:

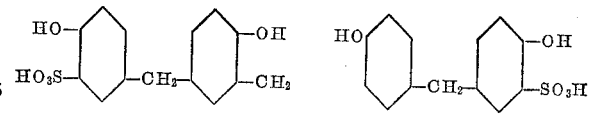

omega sulfonate of dihydroxy dimethyl diphenyl sulfone, omega sulfonate of dihydroxy diphenyl sulfone, omega sulfonate of dihydroxy diphenyl propane, disulfo dihydroxy diphenyl propane, disulfo dihydroxy diphenyl sulfone, and complex compounds containing a benzidine radical with a sulfonimido bridge as illustrated by the following compound:

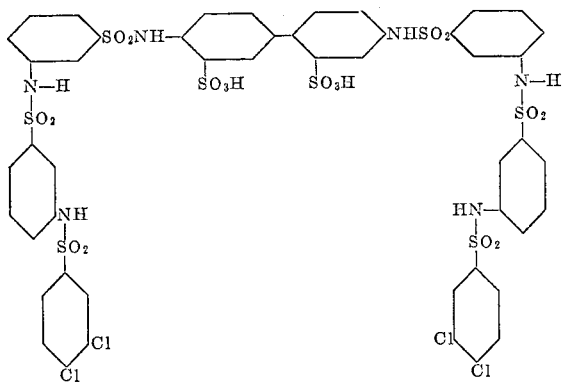

The water soluble salts of these compounds are also operable such as sodium, potassium and ammonium salts as illustrated by the sodium salt of disulfo dinaphthyl methane, the sodium salt of disulfo dihydroxy diphenyl propane and the sodium salt of disulfo dihydroxy diphenyl sulfone.

As indicated heretofore, the modified amino-formaldehyde resins used in this invention are those resins disclosed in my aforementioned patent application Ser. No. 311,149. More particularly, the modified amino-formaldehyde resins are those formed by reacting (a) an amino-formaldehyde resin containing unreacted free methylol groups with (b) a water-soluble amino base, said amino base being present in such amounts whereby all of the methylol groups on the amino-formaldehyde resin are reacted thus providing a cationic-active modified amino-formaldehyde resin which is highly stable in an aqueous medium and will not polymerize or condense therein even on the application of heat. The hereinbefore mentioned amino-formaldehyde resins containing free methylol groups are well known water-soluble or water-dispersible resins formed by the condensation of an amino compound having functional groups with suitable amount of an aldehyde, preferably formaldehyde, with or without a catalyst, at temperatures generally above room temperature.

The preferred modified amino-formaldehyde resins are those formed by the reaction of (a) an amino-formaldehyde resin containing free methylol groups selected from the group consisting of urea-formaldehyde resins, thiourea-formaldehyde resins, dicyandiamide-formaldehyde resins, acetylene diurea-formaldehyde resins and melamine-formaldehyde resins with (b) a water-soluble amino base selected from the group consisting of urea, thiourea, guanidine, acetylene diurea, melamine and dicyandiamide.

In forming the modified amino-formaldehyde resins used in accordance with this invention, the molar proportion of the amino base which is reacted with the amino-formaldehyde resin will of course vary depending upon the number of reactive methylol groups in a molecule of said resin as well as the number of functional amino groups in the amino base. The proportions should be such that all of the reactive methylol groups are reacted with an equal number of functional amino groups in the amino base.

In forming the modified amino-formaldehyde resins, the reaction is preferably carried out at temperatures between the range of 75° C. to 10° C. Also, the time of the reaction will vary in different cases, the time being usually in the range of about 3 to about 10 hours. As is well known, the time may be decreased by increasing the temperature and vice versa. The pH of the reaction medium is preferably slightly acid, neutral or slightly alkaline in nature, i.e., about at least 7. Preferably, an alkaline catalyst such as borax is used to speed up the reaction.

In order to illustrate the invention by working examples, the following examples are now given. Examples A–P are directed to the preparation of modified amino-formaldehyde resins used in accordance with my present invention. If so desired, the modified amino-formaldehyde resins may be prepared in the presence of an anionic active sulfo compound which is neutral as illustrated by Examples Q–V. This is advantageous for the modified amino-formaldehyde resin which is formed and the sulfo compound are already combined and may immediately be dispersed in an aqueous bath for treatment of leather in a manner described in detail hereinbefore. Examples 1 to 12 are directed to the manner of treating leather with the modified amino-formaldehyde resins and high molecular weight sulfo compounds in accordance with the present invention.

*Example A*

180 grams guanidine carbonate and 243 grams formaldehyde (37%) are mixed together in a flask equipped with reflux and refluxed at a temperature of 80° C. for 1 hour. 168 grams dicyandiamide are then added and the mixture is refluxed at 80° C. for 6 hours, the pH of the final reaction product being about 10.5.

*Example B*

180 grams guanidine carbonate and 243 grams formaldehyde (37%) are heated together in a flask equipped with reflux, the temperature being brought up to 80°–90° C. for 1 hour. 126 grams of melamine are added and the mixture is heated and refluxed 4 hours at 95° C., the pH of the final reaction product being about 10.3.

*Example C*

180 grams guanidine carbonate and 243 grams formaldehyde (37%) are heated together in a flask equipped with reflux, at a temperature from 80° to 90° C. for 1 hour. 228 grams thiourea are then added and the mixture is heated and refluxed for 4 hours at 90° C., the pH of the final reaction product being about 9.8.

*Example D*

180 grams guanidine carbonate and 243 grams formaldehyde (37%) are heated together in a flask equipped with reflux, the temperature being brought to 80° to 90° C. for 1 hour. 180 grams urea are then added and the mixture is heated and refluxed for 4 hours at 90° C., the pH of the final reaction product being about 9.9.

*Example E*

126 grams melamine and 489 grams formaldehyde (37%) are heated together in a three neck flask equipped with reflux and the temperature is raised to 80° C. for ½ hr. 360 grams of guanidine carbonate are then added and the mixture is heated and refluxed for 5 hours at 95° C., the pH of the final reaction product being about 9.5.

*Example F*

60 grams urea and 162 grams formaldehyde (37%) are heated together in a flask equipped with a reflux condenser. The temperature is brought to 80° C. for 1½ hours. 360 grams guanidine carbonate and 200 cc. water are then added and the mixture is heated and refluxed for 5 hours at 80° C., the pH of the final reaction product being about 10.2.

*Example G*

120 grams urea, 648 grams formaldehyde (37%) and 38 grams borax are heated together in a flask equipped with a condenser, at a temperature of 80° C. for 1½ hours. 84 grams dicyandiamide are then added and the mixture is heated and refluxed for 3 hours at 80° C. To this product which has no cation active properties are added 84 grams dicyandiamide and the heating is continued for 4 hours at 95° C., the pH of the final reaction product being 9.0.

Example H 142 grams acetylene di-urea, 325 grams formaldehyde (37%) and 1.4 grams borax are heated together in a flask equipped with reflux, the temperature being brought to 95° C. for 4 hours. 180 grams guanidine carbonate are added and the mixture is heated and refluxed for 2 hours at 95° C., the pH of the final rejection product being 10.3.

Example I 142 grams acetylene di-urea and 324 grams formaldehyde (37%) are added together in a flask equipped with reflux and 12 grams NaOH 40° Bé. are added to bring the pH of mixture to 10–12.

The product is agitated for ½ hour until the solution is clear at a temperature 50° to 60° C. 63 grams melamine are then added and the mixture is heated and refluxed for 2 hours at 95° C. 168 grams dicyandiamide are added and the mixture refluxed for 2 hours at 95° C., the pH of the final reaction product being about 9.0.

Example J 284 grams acetylene di-urea, 652 grams formaldehyde (37%) and 1.25 grams borax are mixed in a flask and refluxed for 4 hours at 85° C. under stirring.

470 grams of the final product formed above are mixed with 168 grams dicyandiamide. This mixture is heated and refluxed for 11 hours in a flask equipped with a reflux keeping the temperature at 95° C. The pH of the final reaction product is 8.1.

Example K 84 grams dicyandiamide, 324 grams formaldehyde (37%) and 1.2 grams borax are mixed in a flask and heated and refluxed for 4 hours at 95° C.

142 grams di-acetylene urea powder are added and the mixture is heated and refluxed for 10 hours at 95° C., the pH of the final reaction product being about 8.5.

Example L 168 grams dicyandiamide, 648 grams of formaldehyde (37%) and 3.6 grams of borax are mixed and heated and refluxed at 95° C. for 3½ hours.

336 grams of dicyandiamide are added and the mixture is heated and refluxed for 9 hours at 90° C. to 95° C., the pH of the final reaction product being 9.7.

Example M 84 grams of dicyandiamide are mixed with 324 grams of formaldehyde (37%) and 1.6 grams of borax. The mixture is heated together in a flask equipped with reflux at a temperature of 95° C. for 4 hours.

The mixture is cooled and 180 grams of guanidine carbonate and 208 grams water are added. The resulting mixture is heated and refluxed for 3 hours at 95° C., the pH of the final reaction product being about 10.1.

Example N 84 grams of dicyandiamide, 324 grams of formaldehyde (37%) and 1.2 grams of borax are mixed and heated together in a flask equipped with reflux.

The temperature is brought to 95° C. for 3 hours, the pH at the end of the reaction being 8.5.

240 grams of urea are added and heated and refluxed at 95° C. for 5 hours, the pH of the final reaction product being 9.9.

Example O 84 grams of dicyandiamide, 162 grams of formaldehyde (37%) and 1.2 grams of borax are mixed and heated together at 95° C. for 25 to 30 minutes to form a dicyandiamide-formaldehyde resin. In the above-described reaction, the heating is controlled in such a manner so as to form a water-soluble reaction product. When 1 cc. of the aforedescribed reaction medium at the beginning of the reaction is introduced into 100 cc. of cold water, there results a clear solution. When the reaction has progressed for 25 to 30 minutes, 1 cc. of the reaction medium when introduced into 100 cc. of water imparts thereto a cloudy appearance, thus indicating that the amino modifying agent should be added in order to prevent the formation of a water-insoluble amino-formaldehyde resin.

To the above-described dicyandiamide-formaldehyde resin are added 120 grams of urea (amino modifying agent) and the resulting mixture is heated for 2 hours at 95° C.

Subsequently, 324 grams of $CH_2O$ (37%) are added and the reaction is completed by heating further for 4 hours at 95° C., the pH of the final reaction product being 8.0.

Example P 84 grams of dicyandiamide and 162 grams of formaldehyde (37%) are heated together in a flask equipped with a reflux. The mixture is heated at 95° C. for 25 to 30 minutes to form a dicyandiamide-formaldehyde resin after which an amino-modifying agent is added for reasons mentioned in detail in Example O.

To the above-described dicyandiamide-formaldehyde resin are added 120 grams of urea and the resulting mixture is heated for 2 hours at 95° C.

Subsequently 16.2 grams of formaldehyde (37%) are added and the reaction is completed by heating further for 4 hours at 95° C., the pH of the final reaction product being 8.9.

Example Q 180 grams of guanidine carbonate, 243 grams of formaldehyde (37%) and 1580 grams of the sodium salt of disulfo dinaphthyl methane in 35% water solution are heated and refluxed at 80° C. for 1 hour. 168 grams of dicyandiamide are then added and the temperature is raised to 95° C. and refluxed for 6 hours. The pH of the final mixture is 10.5.

Example R 1580 grams of the sodium salt of disulfo dinaphthyl methane in 35% water solution are heated under reflux at 95° C. with 324 grams of formaldehyde (37%) and 84 grams of dicyandiamide for 4 hours. 142 grams of diacetylene urea are then added and the mixture is then heated at 95° C. for 8 hours, the pH of the final mixture being 8.5.

Example S 90 grams urea, 243 grams formaldehyde (37%) and 15 grams borax are heated together in a flask equipped with a reflux. The temperature is being brought to 80° C. for 1½ hours. 63 grams melamine and 500 grams of the sodium salt of disulfo dinaphthyl methane in 35% water solution are added to the above product. The product is then heated and refluxed for 4 hours at 80° C.

Example T 63 grams melamine, 243 grams formaldehyde (37%) and 790 grams sodium salt of disulfo dinaphthyl methane in 35% water solution are mixed and heated together in a flask equipped with reflux.

The temperature is then brought to 80° C. for 1 hour and 180 grams urea are then added and the mixture is heated and refluxed at 80° C. for 4 hours.

Example U 42 grams dicyandiamide, 162 grams formaldehyde (37%) and 500 grams sodium salt of disulfo dihydroxy diphenyl propane in 50% water solution are mixed and heated together in a flask equipped with reflux.

The temperature is then brought to 95° C. for 4 hours.

84 grams dicyandiamide are then added and the resulting mixture is heated and refluxed for 9 hours at 95° C.

*Example V*

84 grams dicyandiamide, 324 grams formaldehyde (37%) and 1.8 grams borax are mixed and heated together in a flask equipped with reflux.

The temperature is brought to 95° C. for 4 hours. 142 grams diacetylene urea are then added and the resulting mixture is heated and refluxed for 1 hour at 95° C. To this mixture is added 1,000 grams sodium salt of disulfo dihydroxy diphenyl sulfone in 50% water solution and the resulting mixture is heated and refluxed for 10 hours at 95° C.

*Example 1*

100 pounds of calf skin, chrome tanned and shaved, are put into a drum containing an aqueous washing solution and are washed for ¼ hour. The drum is drained and 13 lbs. of a mixture prepared in accordance with Example U is added, said mixture comprising a dicyandiamide-formaldehyde resin modified by dicyandiamide and the sodium salt of disulfo dihydroxy diphenyl propane solution. Seven gallons of water are added along with the above mixture. The skins are then treated with the bath for 1 hour. ½ pound of sulfuric acid 66° Bé. is then added bringing the pH of the bath to about 3. The skins are left in the acid bath for ¼ hour during which period a water insoluble compound is precipitated on the skins. The skins are then washed for ½ hour and are fat liquored with 4 lbs. of sulphonated sperm oil.

*Example 2*

100 pounds of calf skins, chrome tanned and shaved, are put into a drum containing an aqueous washing solution and are washed for ¼ hour. The drum is drained and 4 lbs. of a modified amino-formaldehyde resin prepared in accordance with Example L, along with 7 gallons of water, are added to the drum, said amino-formaldehyde resin being a dicyandiamide formaldehyde resin modified by dicyandiamide. The skins are treated with the resin bath for 1 hour, after which, 10 lbs. of 50% solution of disulfo-dihydroxy diphenyl propane are added to the bath and the skins are left in the bath for ½ hour during which period a water insoluble compound is precipitated on the skins. The skins are then washed and fat liquored with 4 lbs. of sulphonated sperm oil.

*Example 3*

10 pounds of calf skin, chrome tanned and shaved, are put into a drum containing a washing solution and are washed for ¼ hour. The drum is drained and 12 lbs. of a mixture prepared in accordance with Example Q is added along with 7 gallons of water, said mixture comprising a guanidine-formaldehyde resin modified by dicyandiamide and the sodium salt of disulfo-dinaphthyl methane. The skins are then treated with the bath for 1 hour, after which, ½ pound of sulfuric acid 66° Bé. is added and the skins are left in the bath for ¼ hour during which period a water insoluble compound is precipitated on the skins. The skins are then washed for ½ hour and are fat liquored with 4 lbs. of sulphonated sperm oil.

*Example 4*

100 pounds of calf skins, chrome tanned and shaved, are put into a drum containing a washing solution and are washed for ¼ hour. The drum is drained and 3 lbs. of a modified amino-formaldehyde resin prepared in accordance with Example A are added along with 7 gallons of water, said resin being a guanidine-formaldehyde resin modified by dicyandiamide. The skins are then treated with the resin bath for 1 hour, after which 7 lbs. of disulfo dinaphthyl methane in 35 percent water solution are added to the bath and the skins are left in the bath for ½ hour during which period a water insoluble compound is precipitated on the skins. The skins are then washed and fat liquored with 4 lbs. of sulphonated sperm oil.

*Example 5*

100 pounds of calf skin, chrome tanned and shaved, are put into a drum containing a washing solution and are washed for ¼ hour. The drum is drained and 14 lbs. of a mixture prepared in accordance with Example R is added, said mixture comprising a dicyandiamide-formaldehyde resin modified by diacetylene urea and the sodium salt of disulfo dinaphthyl methane. Seven gallons of water are added along with the above mixture. The skins are then treated with the bath for 1 hour. ½ pound of sulfuric acid 66° Bé. is then added. The skins are left in the bath for ¼ hour during which period a water insoluble resinous compound is precipitated on the skins. The skins are then washed and are fat liquored with 4 lbs. sulphonated sperm oil.

*Example 6*

100 pounds of calf skins, chrome tanned and shaved, are put into a drum containing a washing solution and are washed for ¼ hour. The drum is drained and 3 lbs. of a modified amino-formaldehyde resin prepared in accordance with Example K along with 7 gallons of water are added to the drum, said resin being a dicyandiamide-formaldehyde resin modified by diacetylene urea. The skins are treated with the resin bath for 1 hour, after which 6 lbs. of disulfo-dinaphthyl methane are added to the bath and the skins are left in the bath for ½ hour during which period a water insoluble resinous compound is precipitated on the skins. The skins are then washed and fat liquored with 4 lbs. sulphonated sperm oil.

*Example 7*

100 pounds of calf skin, chrome tanned and shaved, are put into a washing solution and are washed for ¼ hour. The drum is drained and 12 lbs. of a mixture prepared in accordance with Example S is added, said mixture comprising a urea-formaldehyde resin modified by melamine and the sodium salt of disulfo dinaphthyl methane in 35% water solution. Seven gallons of water are added along with the above mixture. The skins are then treated with the bath for 1 hour. ½ pound of sulfuric acid 66° Bé. is then added and the skins are left in the bath for ¼ hour during which period a water insoluble compound is precipitated on the skins. The skins are then washed for ½ hour and are fat liquored with 4 pounds of sulphonated sperm oil.

*Example 8*

100 pounds of calf skin, chrome tanned and shaved, are put into a drum containing a washing solution and are washed for ¼ hour. The drum is drained and 13 pounds of a mixture prepared in accordance with Example T is added, said mixture comprising a melamine-formaldehyde resin modified by urea and the sodium salt of disulfo dinaphthyl methane in 35% water solution. Seven gallons of water are added along with the above mixture. The skins are then treated with the bath for 1 hour. ½ lb. of sulfuric acid is then added and the skins are left in the acid bath for ¼ hour during which period a water insoluble compound precipitated on the skins. The skins are washed for ½ hour and are fat liquored with 4 pounds sulphonated sperm oil.

*Example 9*

100 pounds of calf skin, chrome tanned and shaved, are put into a drum containing a washing solution and are washed for ¼ hour. The drum is drained and 13 lbs. of a mixture prepared in accordance with Example V is added, said mixture comprising a dicyandiamide-formaldehyde resin modified by diacetylene urea and the sodium salt of disulfo dihydroxy diphenyl sulfone in 50% water solution. Seven gallons of water are added along with the above mixture. The skins are then treated with the bath for 1 hour. ½ pound of sulfuric acid 66° Bé. is then added and the skins are left in the bath for ¼ hour during which period a water insoluble compound is precipitated on the skins. The skins are then washed for ½ hour and are fat liquored with 4 pounds of sulfonated sperm oil.

*Example 10*

100 pounds of calf skin, chrome tanned and shaved, are put into a drum containing a washing solution and are washed for ¼ hour. The drum is drained and 3 pounds of a modified amino-formaldehyde resin prepared in accordance with Example N, along with 7 gallons of water, are added to the drum, said resin being a dicyandiamide-formaldehyde resin modified by ureau. The skins are tretaed with the resin bath for 1 hour, after which, 7 pounds of disulfo-dihydroxy, diphenyl sulfone are added to the bath and the skins are left in the bath for ½ hour during which period a water insoluble compound is precipitated on the skins. The skins are then washed and fat liquored with 4 pounds of sulphonated sperm oil.

*Example 11*

100 pounds of calf skin, chrome tanned and shaved, are put into a drum containing an aqueous washing solution and are washed for ¼ hour. The drum is drained and 9 pounds of the sodium salt disulfo-dihydroxy diphenyl propane along with 7 gallons of water are added to the drum, and the skins are treated with this composition for ¼ hour. 4 pounds of a modified amino-formaldehyde resin prepared in accordance with Example L are then added to the drum bath and the skins are treated with the bath for 1 hour. ½ pound of sulfuric acid is then added to the bath and the skins are left in the acid bath for ¼ hour during which period a water insoluble compound is precipitated on the skins. The skins are then washed for ½ hour and are fat liquored with 4 pounds of sulphonated sperm oil.

*Example 12*

100 pounds of calf skin, chrome tanned and shaved, are put into a drum containing an aqueous washing solution and are washed for ¼ hour. The drum is drained and 9 lbs. of the sodium salt disulfo-dinaphthyl methane along with 7 gallons of water are added to the drum, and the skins are treated with this composition for ¼ hour. 4 pounds of a modified amino-formaldehyde resin prepared in accordance with Example A are then added to the drum bath and the skins are treated with the bath for 1 hour. ½ pound of sulfuric acid is then added to the bath and the skins are left in the acid bath for ¼ hour during which period a water insoluble compound is precipitated on the skins. The skins are then washed for ½ hour and are fat liquored with 4 pounds of sulphonated sperm oil.

The treated leather products obtained by the process disclosed in the above Examples 1 to 12 have a high degree of fullness and tensile strength. Other materials which may be treated by this process are paper, fabrics, woodwork, etc. wherein the water-insoluble compound precipitated on the object being treated acts as a filler, modifying agent, etc.

The invention in its broader aspects is not limited to the specific steps and compositions described but departures may be made therefrom within the scope of the accompanying claims without departing from the principles of the invention and without sacrificing its chief advantages.

This is a divisional application of co-pending application Ser. No. 311,149, filed September 23, 1952, now U.S. Patent No. 2,944,046.

What is claimed is:

1. The method of treating a porous material to impart thereto a smooth finish, comprising applying to said material a water-soluble cationic-acid modified amino-formaldehyde resin free of unreacted methylol groups, and an anionic-active, high molecular weight compound containing at least one sulfo group whereby said cationic-active and anionic-active materials are absorbed by said porous material, and causing said modified amino-formaldehyde resin and said sulfo containing compound absorbed by said porous material to react to form a water-insoluble product which becomes fixed to said porous material so as to fill the pores thereof.

2. The method according to claim 1, wherein the modified amino-formaldehyde resin is a resin formed by reacting (*a*) a resin selected from the group consisting of urea-formaldehyde resins, thiourea-formaldehyde resins, guanidine-formaldehyde resins, acetylene diurea-formaldehyde resins, melamine-formaldehyde resins and dicyandiamide-formaldehyde resins with (*b*) a water-soluble amine base selected from the group consisting of urea, thiourea, guanidine, acetylene diurea, melamine and dicyandiamine, the water-soluble amino base being in an amount sufficient to react with all of the methylol groups of the amino-formaldehyde resin, said reactions being carried out at a pH of about at least 7.

3. The method according to claim 2, wherein said sulfo compound is selected from the group of water soluble salts of a high molecular weight sulfo compounds and high molecular weight sulfo compounds having free sulfo radicals.

4. The method according to claim 3, wherein the sulfo compound is a neutral salt of a high molecular weight sulfo compound and in which the acid environment is provided by the addition of an acid to said bath after the resin and sulfo compound have been dispersed on said porous material being treated.

5. The method according to claim 3, wherein the sulfo compound is a high molecular weight sulfo compound, having a free sulfo group, said porous material being impregnated first with the modified amino-formaldehyde resin and then with the sulfo compound, said sulfo compound being sufficiently acidic to provide the necessary acidic environment for the reaction of said modified resin and said sulfo compound on said porous material.

6. The method according to claim 4, wherein the porous material is first treated with a neutral high molecular weight sulfo compound and then the modified amino-formaldehyde resin.

7. The method according to claim 3, wherein the porous material is leather.

8. The method according to claim 7, wherein the sulfo compound is the sodium salt of disulfo dinaphthyl methane.

9. The method according to claim 7, wherein the sulfo compound is the sodium salt of disulfo dihydroxy diphenyl propane.

10. The method according to claim 7, wherein the sulfo compound is the sodium salt of disulfo dihydroxy diphenyl sulfone.

11. A coated porous material having a smooth finish comprising a porous material having absorbed thereon a water-insoluble reaction product fixed to said porous material so as to fill the pores thereof, said water-insoluble reaction product formed by the reaction on said porous material of a water-soluble cationic-active modified amino-formaldehyde resin free of unreacted methylol groups, and an anionic-active, high molecular weight compound containing at least one sulfo group.

References Cited in the file of this patent

UNITED STATES PATENTS

| | | |
|---|---|---|
| 2,452,536 | Kirk | Nov. 2, 1948 |
| 2,601,671 | Wilson et al. | June 24, 1952 |
| 2,646,419 | Suen et al. | July 21, 1953 |
| 2,721,145 | Cheronis | Oct. 18, 1955 |

UNITED STATES PATENT OFFICE
CERTIFICATE OF CORRECTION

Patent No. 3,024,136                                        March 6, 1962

Lucien Sellet

It is hereby certified that error appears in the above numbered patent requiring correction and that the said Letters Patent should read as corrected below.

Column 2, line 54, for "proplene" read -- propylene --; column 3, line 44, for "amount" read -- amounts --; line 69, for "10° C." read -- 110° C. --; column 9, line 15, for "ureau" read -- urea --; line 16, for "tretaed" read -- treated --; column 10, line 1, for "cationic-acid" read -- cationic active --; lines 8 and 9, after "water-insoluble" insert -- reaction --.

Signed and sealed this 24th day of July 1962.

SEAL)
Attest:

ERNEST W. SWIDER                                    DAVID L. LADD
Attesting Officer                                       Commissioner of Patents